United States Patent
Mintz

(10) Patent No.: US 11,734,759 B2
(45) Date of Patent: *Aug. 22, 2023

(54) SYSTEM AND METHOD FOR A RISK CHECK

(71) Applicant: TRADING TECHNOLOGIES INTERNATIONAL INC., Chicago, IL (US)

(72) Inventor: Sagy Pundak Mintz, Austin, TX (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,263

(22) Filed: Nov. 23, 2021

(65) Prior Publication Data

US 2022/0084117 A1    Mar. 17, 2022

Related U.S. Application Data

(63) Continuation of application No. 16/726,496, filed on Dec. 24, 2019, now Pat. No. 11,216,880, which is a
(Continued)

(51) Int. Cl.
*G06Q 40/00* (2023.01)
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ............................... G06Q 40/04; G06Q 40/06
See application file for complete search history.

(56) References Cited

U.S. PATENT DOCUMENTS

| 7,113,924 B2 | 9/2006 | Fishbain |
| 7,310,620 B2 | 12/2007 | Moore et al. |

(Continued)

FOREIGN PATENT DOCUMENTS

| AU | 2003238004 B2 | 9/2003 | |
| CA | 2404883 A1 * | 3/2001 | ............. G06F 17/60 |

OTHER PUBLICATIONS

Spinler et al: "The valuation of options on capacity with cost and demand uncertainty" European Journal of Operational Research 171 (2006) 915-934 (Year: 2006).*

(Continued)

*Primary Examiner* — Edward J Baird
(74) *Attorney, Agent, or Firm* — McDonnell Boehnen Hulbert & Berghoff LLP

(57) ABSTRACT

Various systems and methods are described herein for a risk check. The risk check bases a decision to allow a trading strategy to proceed on whether the order quantity for each leg of the trading strategy satisfies a certain condition. Particularly, when a trading strategy is initiated, the quantity for each of the orders to be submitted on behalf of the trading strategy, including the quantity of the initial order and any subsequent orders, is then compared to a corresponding risk value. If the order quantity for each of the orders is less than the corresponding risk value, then the trading strategy can proceed and the initial order can be sent on to the exchange. However, if the order quantity for any of the orders exceeds the risk value, then the initial order is not sent to the electronic exchange. Additionally, as described herein, quantity associated with the trading strategy is held or reserved for execution of the trading strategy regardless of the activity taken by the trader since the trading strategy was initiated. The reserved quantity can be drawn from the
(Continued)

trading strategy until the quantity is depleted, the trading strategy has ended, or both, for example.

15 Claims, 2 Drawing Sheets

Related U.S. Application Data continuation of application No. 14/030,047, filed on Sep. 18, 2013, now Pat. No. 10,572,938, which is a continuation of application No. 12/410,210, filed on Mar. 24, 2009, now Pat. No. 8,566,219.

(56) References Cited

U.S. PATENT DOCUMENTS

| | | | |
|---|---|---|---|
| 7,711,633 B2 | 5/2010 | Driscoll et al. | |
| 7,827,092 B2 | 11/2010 | Chait et al. | |
| 7,844,536 B1 | 12/2010 | Andrews et al. | |
| 7,848,994 B1 | 12/2010 | Andrews et al. | |
| 7,912,778 B2 | 3/2011 | Nanjundamoorthy | |
| 8,090,640 B2 | 1/2012 | Nalbandian et al. | |
| 8,249,977 B2 | 8/2012 | Kontos et al. | |
| 8,566,219 B2 | 10/2013 | Mintz | |
| 10,572,938 B2 | 2/2020 | Mintz | |
| 11,216,880 B2 | 1/2022 | Mintz | |
| 2002/0082967 A1* | 6/2002 | Kaminsky | G06Q 40/04 705/37 |
| 2003/0069826 A1 | 4/2003 | Guidi et al. | |
| 2003/0229569 A1* | 12/2003 | Nalbandian | G06Q 40/00 705/37 |
| 2003/0229570 A1* | 12/2003 | Hughes, Jr. | G06Q 40/04 705/37 |
| 2004/0024713 A1* | 2/2004 | Moore | G06Q 40/04 705/75 |
| 2004/0034591 A1* | 2/2004 | Waelbroeck | G06Q 30/0255 705/37 |
| 2004/0153393 A1 | 8/2004 | West et al. | |
| 2004/0230514 A1 | 11/2004 | Burgis et al. | |
| 2004/0230515 A1 | 11/2004 | Crosthwaite et al. | |
| 2004/0230522 A1 | 11/2004 | Crosthwaite et al. | |
| 2005/0027635 A1 | 2/2005 | Monroe et al. | |
| 2005/0108178 A1 | 5/2005 | York | |
| 2005/0273424 A1 | 12/2005 | Silverman et al. | |
| 2005/0288988 A1 | 12/2005 | Yoshida et al. | |
| 2007/0016506 A1 | 1/2007 | Davies et al. | |
| 2007/0038549 A1 | 2/2007 | Janowski et al. | |
| 2007/0078752 A1* | 4/2007 | Burns | G06Q 40/04 705/37 |
| 2007/0118457 A1 | 5/2007 | Peterffy et al. | |
| 2007/0288342 A1* | 12/2007 | Maclin | G06Q 40/04 705/37 |
| 2007/0294159 A1 | 12/2007 | Cottle | |
| 2008/0010183 A1 | 1/2008 | Holmes et al. | |
| 2008/0015974 A1* | 1/2008 | Balabon | G06Q 40/04 705/37 |
| 2008/0077521 A1 | 3/2008 | Sibley et al. | |
| 2008/0243672 A1 | 10/2008 | Driscoll et al. | |
| 2008/0288390 A1 | 11/2008 | Maynard | |
| 2009/0089200 A1 | 4/2009 | Stephen et al. | |
| 2009/0187511 A1 | 7/2009 | Doornebos et al. | |
| 2009/0265282 A1* | 10/2009 | Noviello | G06Q 40/04 705/37 |
| 2009/0271325 A1 | 10/2009 | Wilson | |
| 2010/0250423 A1 | 9/2010 | Mintz | |
| 2014/0025555 A1 | 1/2014 | Mintz | |
| 2020/0134723 A1 | 4/2020 | Mintz | |

OTHER PUBLICATIONS

International Search Report from International Application No. PCT/US10/28319 dated May 4, 2010.

Keister et al: "Divorcing Money From Monetary Policy", Economic Policy Review—Federal Reserve Bank of New York; New York vol. 14, Iss. 2, (Sep. 2008) (Year: 2008).

Schwartz, "Short-Term Variations and Long-Term Dynamics in Commodity Prices", Management Science, vol. 46, No. 7, pp. 893-911, Jul. 2000.

\* cited by examiner

SYSTEM AND METHOD FOR A RISK CHECK

CROSS REFERENCE TO RELATED APPLICATIONS

The present application is a continuation of U.S. patent application Ser. No. 17/534,263, filed Nov. 23, 2021, which is a continuation of U.S. patent application Ser. No. 16/726,496, filed Dec. 24, 2019, now U.S. Pat. No. 11,216,880, which is a continuation of U.S. patent application Ser. No. 14/030,047, filed Sep. 18, 2013, now U.S. Pat. No. 10,572,938, which is a continuation of U.S. patent application Ser. No. 12/410,210, filed Mar. 24, 2009, now U.S. Pat. No. 8,566,219, the contents of each of which are fully incorporated herein by reference for all purposes.

FIELD OF INVENTION

The present invention is directed towards electronic trading. More particularly, embodiments of the present invention are directed towards a risk check.

BACKGROUND

An electronic trading system provides for electronically matching orders to buy and sell items to be traded. The items may include, for example, stocks, options, and commodities. Typically, an electronic exchange in the electronic trading system is used to match the orders. A match at the exchange refers to either a full match of the order or a partial match of the order. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices. An example of an electronic exchange is the CME® Globex® electronic trading platform, which is offered by the Chicago Mercantile Exchange (CME).

Users of electronic trading systems often employ risk management techniques to manage or limit the risk associated with electronic trading. However, current risk management techniques have disadvantages that may result in a number of unfavorable outcomes to the user including, for example, a complete failure of a trading strategy. Indeed, the current risk management techniques might actually cause greater risk in certain circumstances than a reduction in risk as they were originally intended and designed.

SUMMARY

Embodiments described herein include a system, method, and computer readable medium for risk check in electronic trading. As described herein, a risk check system and method bases a decision to allow a trading strategy to proceed on whether the order quantity for each leg of the trading strategy satisfies a certain condition. Particularly, when a trading strategy is initiated, the quantity for each of the orders to be submitted on behalf of the trading strategy, including the quantity of an initial order, is then compared to a corresponding risk value. If the order quantity for each of the orders is less than the corresponding risk value, then the trading strategy can proceed and the initial order can be sent to the exchange. However, if the order quantity for any of the orders exceeds the corresponding risk value, then the initial order is not sent to the electronic exchange. Additionally, as described herein, quantity associated with the trading strategy is held or reserved for execution of the trading strategy regardless of the activity taken by the trader since the trading strategy was initiated. This reserved quantity can be drawn from the trading strategy until the quantity is depleted, the trading strategy has ended, or both, for example.

For example, a method for risk check includes identifying a first order quantity corresponding to a first order and a second order quantity corresponding to a second order, where the first order and the second order are part of a trading strategy. According to the trading strategy, the second order is placed at a second electronic exchange subsequent to detection of a match of the first order at a first electronic exchange. The first order quantity is compared to a first risk value and the second order quantity is compared to a second risk value. An indication is generated when the first order quantity does not exceed the first risk value and when the second order quantity does not exceed the second risk value. The first order is sent on to the exchange responsive to the indication. However, the example method may also include generating a second type of indication when the first order quantity exceeds the first risk value, the second order quantity exceeds the second risk value, or both occur. The first order is not sent to the electronic exchange responsive to the second type of indication.

In another example, a system for risk check includes a quantity identification component and a risk check analyzer component. The quantity identification component is configured to identify a first order quantity corresponding to a first order and a second order quantity corresponding to a second order, where the first order and the second order are part of a trading strategy. According to the trading strategy, the second order is placed at a second electronic exchange subsequent to detection of a match of the first order at a first electronic exchange. The risk check analyzer component is configured to compare the first order quantity to a first risk value and the second order quantity to a second risk value. The risk check analyzer component provides an indication when the first order quantity does not exceed the first risk value and when the second order quantity does not exceed the second risk value. The first order may be sent on to the exchange responsive to the indication. However, the risk check analyzer component may also provide a second type of indication when the first order quantity exceeds the first risk value, the second order quantity exceeds the second risk value, or both occur. The first order is not sent to the electronic exchange responsive to the second type of indication.

Many advantages, features, and characteristics of the present invention will become apparent from the following detailed description of the various example embodiments and accompanying drawings, all of which form a part of this specification.

BRIEF DESCRIPTION OF THE DRAWINGS

Example embodiments are described herein with reference to the following drawings.

Figure 1:
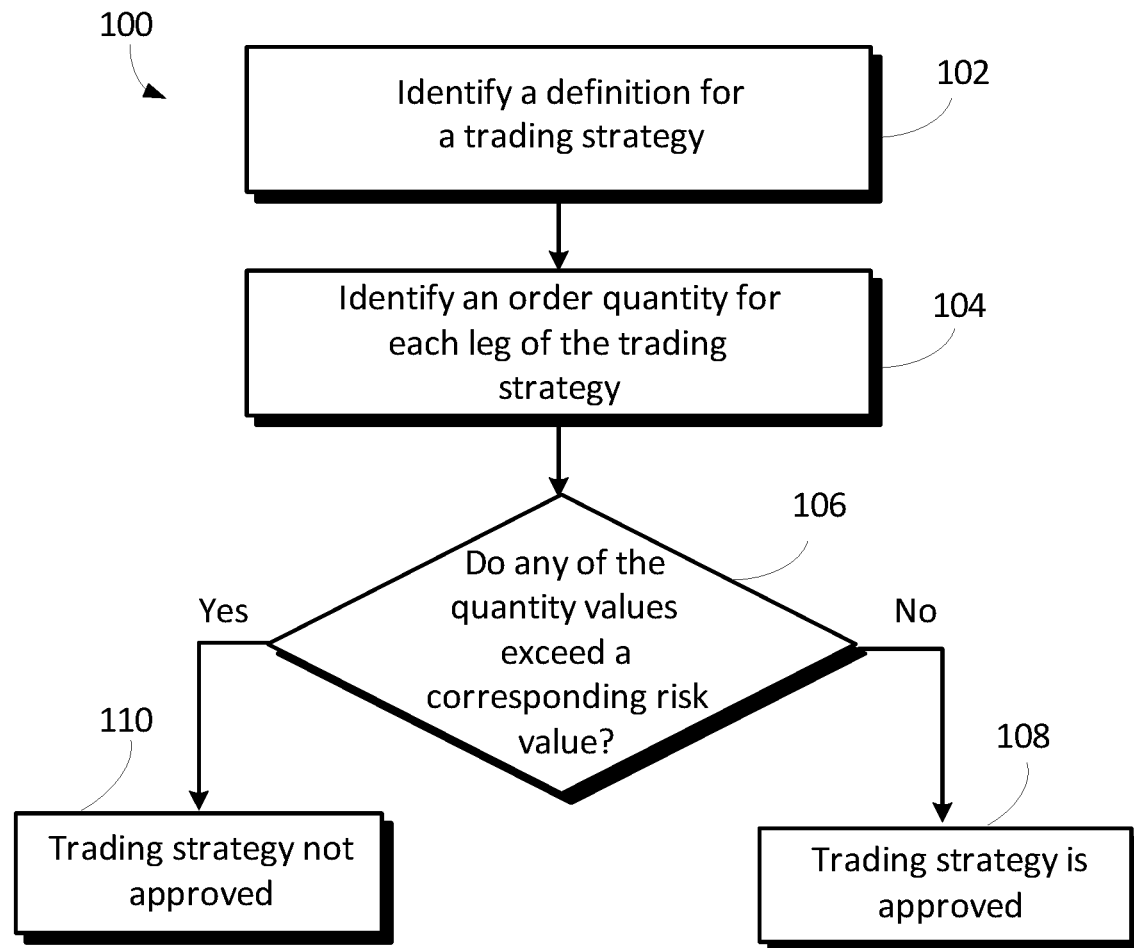
FIG. 1 illustrates a flowchart of a method for trading in an electronic trading environment using a risk check according to certain embodiments of the present invention.

The foregoing will be better understood when read in conjunction with the drawings which show certain embodiments of the present invention. The drawings are for the purpose of illustrating certain embodiments, but it is understood that the present invention is not limited to the arrangements and instrumentality shown in the drawings.

DETAILED DESCRIPTION

Embodiments described herein provide for a risk check for use in electronic trading. The risk check bases a decision to allow a trading strategy to proceed on whether the order quantity for each leg of the trading strategy satisfies a certain condition. For instance, when a trading strategy is initiated, the quantity for each of the orders to be submitted on behalf of the trading strategy, including the quantity of an initial order and any subsequent orders, is then compared to a corresponding risk value(s). If the order quantity for each of the orders is less than the corresponding risk value (or, for example, the order quantity satisfies a condition based on the risk value), then the trading strategy can proceed and the initial order can be sent on to the electronic exchange. However, if the order quantity for any of the orders exceeds the risk value, then the initial order is not sent on to the electronic exchange.

Additionally, as described herein, order quantity associated with the trading strategy is held or reserved for execution by the trading strategy regardless of the activity taken by the trader since the trading strategy was approved and/or initiated. This reserved quantity can be drawn from the trading strategy until the order quantity is depleted, the trading strategy has ended, or both, for example. Quantity that is not used by the end of the trading strategy may then be used by other strategies.

As used herein, a "tradeable object" refers to anything that can be traded with a price, a quantity, or both price and quantity. For example, financial products such as stocks, options, bonds, futures, currency, warrants, funds derivatives, commodities, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread. A tradeable object may also include traded events or goods, for example.

I. Risk Check

FIG. 1 illustrates a sample flowchart 100 of a method for trading in an electronic trading environment using a risk check according to certain embodiments.

At block 102, a definition for a trading strategy is received and/or identified. A definition for a trading strategy, for example, represents a predefined set of rules for making trading decisions. It is understood that the risk check is not limited to a particular trading strategy, and that the trading strategies used herein are meant to illustrate various embodiments of risk check. For example, a trading strategy might involve placing at least one order at an electronic exchange, and then offsetting a fill (e.g., either a complete or partial fill) of that order with the placement of one or more subsequent orders in one or more tradeable objects. In another example, a trading strategy might involve buying or selling a first tradeable object and selling or buying a second tradeable object, where the first tradeable object is different from the second tradeable object. In yet another example, a trading strategy might involve buying or selling three or more tradeable objects. In another example, a trading strategy might involve buying and selling the same tradeable object. Regardless of the trading strategy, each tradeable object of the trading strategy may be referred to herein as a "leg" of the trading strategy.

At block 104, a buy or sell order quantity for each leg of the trading strategy is received and/or identified. It is also understood that the risk check is not limited to how the order quantities for each leg are calculated, and that the calculations used herein are meant to illustrate various embodiments of risk check. For example, the buy or sell order quantity for a leg might be electronically calculated based on a desired quantity for the trading strategy. In another example, the buy or sell order quantity for a leg is directly input into a computing device by a user. Additionally, the buy or sell order quantity for each leg may represent order quantity for more than a single order to be placed in a leg. Also, the buy or sell order quantity may represent order quantity for an order to be quoted, and/or the buy or sell order quantity represents order quantity for an offset or hedge order. In certain embodiments, the order quantity for each leg is stored in a computer data structure. Regardless of how or where the first order quantity is calculated, certain embodiments per block 104 receive and/or identify the buy or sell order quantity value for each leg of the trading strategy.

For example, if a trading strategy includes buying "10" of leg 1 and selling "15" of leg 2, then the buy order quantity identified for leg 1 is "10" and the sell order quantity identified for leg 2 is "15," according to block 104. These values could be received and/or identified by the risk check by getting the values from a computing device configured to compute them or by reading a data structure with the values stored therein, for example.

At block 106, a comparison is made between the buy or sell order quantity values for each leg of the trading strategy and a corresponding risk value(s) for each corresponding leg. In certain embodiments, a risk value for each leg is calculated based on various inputs, including one or more user defined values. For example, the risk value may be calculated based on a "maximum position" taken in a particular leg, a "maximum order quantity" for an order to be placed in a particular leg, or both, where the "maximum position" and "maximum order quantity" for a particular leg represent values that are pre-configured by a trader or risk administrator, for example. Consequently, if more than one risk value is calculated (e.g., if the order quantity is compared to both a maximum position and a maximum order quantity), then the buy or sell order quantity value may be compared to each of the risk values. However, if a plurality of risk values is computed, it may be possible to combine them into a single risk value for comparison. The following formulas may be used to calculate one or more risk values based on conditions existing at a current time and various user inputs.

For a Sell Order in a Leg:

> Risk Value 1=Maximum position in the leg+Current position in the leg−Quantity of all working sell orders in the leg, where the maximum position is a positive value and current position is a positive value if long (bought) or a negative value if short (sold);

> Risk Value 2=Maximum order quantity for the leg.

For a Buy Order in a Leg:

> Risk Value 3=Maximum position in the leg−Current position in the leg−Quantity of all working buy orders in the leg, where the maximum position is a positive value and current position is a positive value if long (bought) or a negative value if short(sold); and Risk Value 4=Maximum order quantity for the leg.

Using the example formulas above, assume the following is computed for leg 1, which is to be bought based on the trading strategy, at an instant in time when determining whether to approve the trading strategy:

Risk Value 3=25; and

Risk Value 4=15.

Also, assume the following is computed for leg 2, which is to be sold based on the trading strategy, at an instant in time when determining whether to approve the trading strategy:

Risk Value 1=20; and

Risk Value 2=15.

Consequently, the buy order quantity in leg 1 cannot exceed the risk value of "15" (given that "15" is less than "25"). Similarly, the sell order quantity in leg 2 cannot exceed the risk value of "15" (given that "15" is less than "20"). According to this example, the trading strategy would be approved to proceed, because the trading strategy calls for buying "10" of leg 1, and selling "15" of leg 2, which are both less than or equal to their corresponding risk values.

At block 108, the trading strategy is "approved" when each of the order quantity values is determined to be less than the corresponding risk value(s) (or, each of the order quantities satisfy a condition based on the risk value). Thus, the first order of the trading strategy may be placed in the exchange order book at the electronic exchange. Then, other orders can also be placed with no risk, or substantially no risk, of being rejected due to the approved risk check. In certain embodiments, the trading strategy is approved so that all orders related to the trading strategy can be placed at one time or another to execute the trading strategy. In certain embodiments, a quantity amount equal to or nearly equal to the quantity value for each leg is held or reserved for the trading strategy and not other trading strategies. In certain embodiments, the quantity amount equal to or nearly equal to the second order quantity is held for the trading strategy and not other trading strategies. In certain embodiments, the reserved quantity cannot be used to execute other trading strategies.

Using the above example, when the trading strategy is approved, the system will adjust both the current positions in legs 1 and 2 to account for the working buy order in leg 1 and the subsequent working sell order in leg 2. As such, the order quantity for the trading strategy is "reserved," in that subsequent trading strategies cannot also lean on quantity reserved for this trading strategy.

At block 110, the trading strategy is not approved when the order quantity value is determined to exceed the risk value(s) (or, each of the order quantities does not satisfy a condition based on the risk value). Thus, the first order is rejected. In other words, the first order is not currently placed at the electronic exchange. In certain embodiments, all orders for the trading strategy including the first order cannot be placed at the exchange. In alternate embodiments, if a first order was already placed and the trading strategy is not approved, then the first order and any other orders related to the trading strategy are deleted from the exchange.

In some embodiments, the system may be configured such that if an order quantity exceeds a risk value, then the order quantity is reduced to an acceptable level (e.g., so as not to exceed the risk value). The amount the order quantity is reduced may be determined by a user allowing a certain percentage reduction in the order quantity. This may affect the outcome of the trading strategy by reducing the overall amount that is bought or sold of the trading strategy. For example, assume a trader wishes to buy "5" of a spread between leg 1 and leg 2, with a 1:1 spread ratio (in certain embodiments, a spread ratio may be used to determine the number of leg contracts that are traded per one lot spread order). In other words, the trader wishes to buy "5" of the spread, which translates to buying "5" of leg 1 and selling "5" of leg 2. If the system determines that the order quantity in leg 1 exceeds the risk value by "2," then the system can adjust the trading strategy to buy "3" of the spread versus the original "5." Thus, the new spread would buy "3" of leg 1 and sell "3" of leg 2—which satisfies the corresponding risk values for each leg. However, if the trader does not want to implement the spread if the quantity reduction results in buying 10% less of the spread than originally desired, for example, then the system would reject the strategy instead of modifying it, because buying only "3" of the spread is greater than a 10% quantity reduction of "5." Also, in some embodiments, the system will notify the trader before the trading strategy is changed, provide details on a possible modification, and then wait for confirmation to proceed to modify the trading strategy. In other embodiments, the modification is automatic.

II. An Example Electronic Trading System

Figure 2:
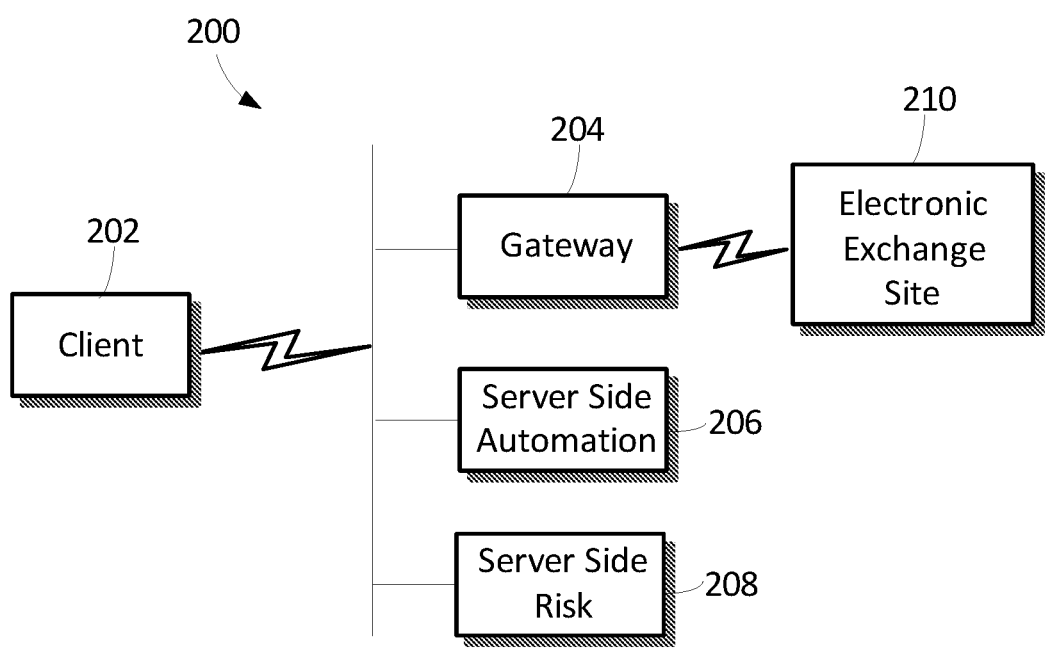
FIG. 2 illustrates an example electronic trading system in which certain embodiments of the present invention may be employed.

FIG. 2 illustrates an example electronic trading system 200 in which certain embodiments may be employed. The system 200 includes client device 202, gateway device 204, server side automation device ("SSA") 206, server side risk ("SSR") 208, and electronic exchange 210. According to this example, client device 202 is in communication with gateway 204. Gateway 204 is in communication with electronic exchange 210. SSA 206 may be in communication with client device 202 and gateway 204. SSR 208 may be in communication with any of client device 202, SSA 206, and gateway 204.

According to some operations, client device 202 is adapted to send orders to buy or sell tradeable objects at exchange 208. Orders to be placed at exchange 210 via client device 202 are sent through gateway 204. In addition, market data may be sent from exchange 210 to client device 202 via gateway 204. Market data may be monitored via client device 202 and a user can base decisions to send trade orders to exchange 210 for one or more tradeable objects. Trading decisions at client device 202 may be manual or automated. In some embodiments, orders placed via the client device 202 are risk checked utilizing the techniques described herein. For instance, orders to be placed via client device 202 are risk checked so that position and/or order size limits for each leg of a trading strategy will not be exceeded.

According to some operations, SSA 206 is adapted to send orders to buy or sell tradeable objects at exchange 210 on behalf of the user of client device 202. Orders to be placed at exchange 210 via SSA 206 are sent through gateway 204. Market data may be sent from exchange 210 to SSA 206 via gateway 204. SSA 206 may monitor the market data and base decisions to send an order for a tradeable object. Trading decisions at SSA 206 are generally automated, but it may be adapted for manual intervention by user of client device 202, for example. In certain embodiments, orders placed via SSA 206 are risk checked utilizing the techniques described herein. For instance, orders to be placed via SSA 206 are risk checked so that position and/or order size limits for each leg of a trading strategy will not be exceeded.

Client device 202 may include one or more electronic computing platforms such as a hand-held device, laptop, personal computer, workstation with a single or multi-core processor, server with multiple processors, and/or cluster of computers, for example. A present day commercial example might include a computing device that utilizes the Windows XP Professional operating system and has at least 2 GB of memory, two dual-core or two quad-core processors, a network card, and at least 10 GB of hard drive space to accommodate software. Client device 202 may communicate with the trading network using a local area network, a wide area network, a virtual private network, a T1 line, a T3 line, a point-of-presence, and/or the Internet, for example.

Client device 202 may be configured to run one or more trading applications. The trading application(s) may, for example, process market data by arranging and displaying the market data in trading and charting windows on a display screen. This processing may be based on user preferences, for example. In addition to manual style trading tools, the trading application(s) may include an automated trading tool such as an automated spread trading tool, for example. In another example, client device 202 may be a computing system running a copy of X_TRADER™, an electronic trading platform provided by Trading Technologies International, Inc. of Chicago, Ill. Regardless of the type of trading application, client device 202 may be adapted to send orders to buy and sell tradeable objects listed at exchange 210. Client device 202 may also be adapted to cancel orders, change orders, and/or query exchange 210, for example. Client device 202, including the one or more trading applications, may also be configured to operate with one or more trading applications at SSA 206, more of which is described below.

Client device 202 may include a user interface. The user interface may include one or more display devices for presenting a text-based or graphical interface to a user, for example. Display devices may include computer monitors, hand-held device displays, projectors, and/or televisions. The user interface may be used by the user to specify or review parameters for an order using a trading application. The user interface may include one or more input devices for receiving input from a user. For example, the input devices may include a keyboard, trackball, two or three-button mouse, and/or touch screen. The user interface may include other devices for interacting with a user. For example, information may be aurally provided to a user through a speaker and/or received through a microphone.

In some embodiments, client device 202 includes a risk check analyzer component to perform block 106 in FIG. 1, for example, to determine whether a trading strategy is approved. Client device 202 may be configured to perform other blocks in FIG. 1 in addition to block 106, for example. Client device 202 and SSR 208 may also be configured to share responsibility to perform a risk check. In other embodiments, client device 202 is not utilized to perform a risk check, but some other computing device like SSR 208 is configured to perform the risk check (e.g., SSR 208 includes a quantity identification component per block 104 and a risk check analyzer per block 106).

Server side automation ("SSA") 206 may include one or more electronic computing platforms such as a personal computer, workstation with a single or multi-core processor, server with multiple processors, and/or cluster of computers, for example. A present day commercial example might include a computing device that utilizes the Windows 2003 Server (Server Pack 2) operating system and has at least 4 GB of memory, two dual-core or two quad-core processors, two or more network cards with at least one pointed to the internal network and one pointed to the exchange, and at least 30 GB of hard drive space to accommodate software. SSA 206 may be used to implement automated or semi-automated trading programs. Orders may be sent directly from SSA 206 to exchange 210 through gateway 204. Orders may also be sent from another computer device to exchange 210 via instructions from SSA 206, for example.

Server side risk ("SSR") 208 may include one or more electronic computing platforms such as a personal computer, workstation with a single or multi-core processor, server with multiple processors, and/or cluster of computers, for example. A present day commercial example might include a computing device that utilizes the Windows 2003 Server (Server Pack 2) operating system and has at least 4 GB of memory, two dual-core or two quad-core processors, two or more network cards with at least one pointed to the internal network and one pointed to the exchange, and at least 30 GB of hard drive space to accommodate software.

In some embodiments, SSR 208 includes a risk check analyzer component to perform block 106 in FIG. 1, for example, to determine whether a trading strategy is approved. SSR 208 may include a quantity identification component to receive and/or identify an order quantity to be bought or sold in each leg of a trading strategy. When used, SSR 208 can notify client device 202 and/or SSA 206 whether to proceed with a particular trading strategy. In certain embodiments, SSR 208 performs other steps in FIG. 1 in addition to blocks 104 and 106, for example. In some embodiments, client device 202 and/or SSA 206 and SSR 208 share responsibility to perform a risk check. In other embodiments, SSR 208 is not utilized, but some other computing device like client device 202 or gateway 204 is configured to perform a risk check utilizing the techniques described herein.

Gateway 204 may include one or more electronic computing platforms such as a personal computer, workstation with a single or multi-core processor, server with multiple processors, and/or cluster of computers, for example. In certain embodiments, gateway 204 communicates with client device 202 and/or SSA 206 and/or SSR 208 using a local area network, a wide area network, a virtual private network, a T1 line, a T3 line, a point-of-presence, and/or the Internet, for example. A present day commercial example might include a computing device that utilizes the Windows 2003 Server (Server Pack 2) operating system and has at least 4 GB of memory, two dual-core or two quad-core processors, two or more network cards with at least one pointed to the internal network and one pointed to the exchange, and at least 30 GB of hard drive space to accommodate software.

Gateway 204 is adapted to communicate with client device 202 and/or SSA 206 and/or SSR 208 and exchange 210. Gateway 204 facilitates communication between the various devices on the trading network and exchange 210. For example, gateway 204 may receive orders from client device 202 and/or SSA 206 and transmit the orders to exchange 210. As another example, gateway 204 may receive market data from exchange 210 and transmit the market data to client device 202 and/or SSA 206. As previously discussed, gateway 204 may also be configured to implement certain embodiments of the present invention.

Particularly, gateway 204 may be configured to process data communicated between client device 202 and/or SSA 206 and exchange 210. For example, gateway 204 may process an order received from client device 202 and/or SSA 206 into a data format acceptable by exchange 210. Similarly, gateway 204 may transform market data in an exchange-specific format received from exchange 210 into a format understood by client device 202 and/or SSA 206. The processing of gateway 204 may also include tracking orders from client device 202 and/or SSA 206 and updating the status of the order based on fill confirmations received from exchange 210, for example. As another example, gateway 204 may coalesce market data from exchange 210 and provide it to client device 202 and/or SSA 206.

Exchange 210 is adapted to match orders to buy and sell tradeable objects. The tradeable objects may be listed for trading at exchange 210. The orders may include orders received from client device 202 and/or SSA 206, for example. Orders may be received from client device 202 and/or SSA 206 through gateway 204, for example. In addition, the orders may be received from other devices in communication with exchange 210. That is, typically exchange 210 will be in communication with a variety of other client devices (which may be similar to client device 202) or other computing devices that also provide orders to be matched. An example of exchange 210 is an electronic trading platform offered by CME Group, located in Chicago, Ill.

Exchange 210 is adapted to provide market data. The market data may be provided to the client device 202 and/or SSA 206, for example. The market data may be provided to the client device 202 and/or SSA 206 through gateway 204, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at other prices away from the inside market. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, system 200 includes more than one client device 202. For example, multiple client devices similar to the client device 202, discussed above, may be in communication with gateway 204 to send orders to the exchange 210.

In certain embodiments, system 200 includes more than one gateway 204. For example, multiple gateways similar to the gateway 204, discussed above, may be in communication with the client device 202 and/or SSA 206 and the exchange 204. Such an arrangement may be used to provide redundancy should gateway 204 fail, for example. System 200 might also include additional gateways to facilitate communication between client device 202 and/or SSA 206 and other exchanges besides exchange 210.

In certain embodiments, system 200 includes more than one exchange 210. For example, the gateway 204 may be in communication with multiple exchanges similar to the exchange 210, discussed above. Such an arrangement may allow client device 202 and/or SSA 206 to trade at more than one exchange through gateway 204, for example.

In certain embodiments, gateway 204 is part of client device 202 and/or SSA 206. For example, the components of gateway 204 may be part of the same computing platform as the client device 202 and/or SSA 206. As another example, the functionality of gateway 204 may be performed by components of the client device 202 and/or SSA 206. In certain embodiments, gateway 204 is not present. Such an arrangement may occur when the client device 202 and/or SSA 206 does not need to utilize gateway 204 to communicate with exchange 210, for example. For example, if client device 202 and/or SSA 206 have been adapted to communicate directly with exchange 210.

In certain embodiments, any of gateway 204, SSA 206, and SSR 208 is physically located at the same site as the client device 202. In certain embodiments, any of gateway 204, SSA 206, and SSR 208 is physically located at the same site as exchange 210. In certain embodiments, client device 202 is physically located at the same site as the exchange 210. In certain embodiments, any of gateway 204, SSA 206, and SSR 208 is physically located at a site separate from both the client device 202 and the exchange 210.

While not shown for the sake of clarity, in certain embodiments, system 200 may include other devices that are specific to the communications architecture such as middleware, firewalls, hubs, switches, routers, exchange-specific communication equipment, modems, security managers, and/or encryption/decryption devices.

In certain embodiments, when at least one order is rejected due to a risk check, a message or indication is provided. In certain embodiments, no message is provided except that the trading strategy fails to proceed. In certain embodiments, when at the trading strategy is approved, another message or indication is provided. For example, a risk check analyzer component may be configured to provide such messages and/or indications.

In certain embodiments, the trading strategy can be modified during execution. For example, the price, quantity, or both can be changed for an active trading strategy. Upon increasing the quantity of a working spread order, for example, a risk check is performed similar to as discussed above. If the proposed change passes the risk check, the trading strategy can be modified by adjusting order quantity in one or more tradeable objects. If the proposed change fails the risk check, then the trading strategy cannot be modified, for example.

III. First Example

In operation, a trader might define a trading strategy that involves placing at least two orders in a single market or multiple markets. In certain embodiments, the trading strategy is a spread trading strategy, in which a quoting order is placed for a tradeable object and a hedge order is placed for a tradeable object when the quoting order is filled. In other words, a quoting order is sent to a leg of the spread to work a bid or offer to achieve the desired spread price. When the quoting order is filled, an offsetting hedge order is sent to another leg to complete the spread at the desired spread price. Certain embodiments include storing the definition at client device 202 in FIG. 2, for example. In certain embodiments, the trading strategy definition is stored at SSA 206, for example. In certain embodiments, the definition is stored at exchange 210. The definition might also be stored at a variety of different computing devices.

A trader may utilize a trading tool to trade according to a trading strategy. For example, the trading tool, Autospreader™ provided by Trading Technologies International, Inc. of Chicago, Ill., provides a software tool for trading spreads. Autospreader also provides a mechanism for defining the trading strategy. Defining a spread strategy using Autospreader may include entering a spread ratio, spread multiplier, tolerance parameters (e.g., slop), and other parameters. Components of a tool like Autospreader tool may be implemented at client device 202, SSA 206, or a combination of client device 202 and SSA 206, for example.

For example, assume that a trader configures a two-legged spread. That is, the spread is between two tradeable objects, and each tradeable object represents one leg of the spread. Assume also that a spread ratio is set to be 1-to-1. In certain embodiments, a spread ratio may be used to determine the number of leg contracts that are traded per one lot spread order. The trader also wishes to quote in only one leg of the spread. With the trading strategy defined, the trader may begin initiating orders.

In certain embodiments, the trader may enter a spread order, which includes a spread price (referred to as a desired spread price) and a spread quantity. Responsively, a tool like Autospreader computes an order quantity to quote. The order quantity to be hedged may also be computed using the spread ratio and quoting order quantity.

In certain embodiments, the quantity to be quoted and the quantity to be hedged are risk checked to determine whether to allow the trading strategy to proceed by placing the quoting order at exchange 210. Particularly, the risk check identifies the quantity to be quoted and the quantity to be hedged and compares the order quantity value in each leg to a corresponding risk value. If each of the quantity values is equal to or less than the corresponding value, then the trading strategy can proceed and the quoting order is sent to the exchange. When the quoting order is filled, the hedge order can be sent without the risk (or substantially reduced risk) of being rejected by a risk check. However, if any of the order quantity values exceeds the risk value, then the quoting order is refrained from being sent to the electronic exchange. As discussed above, steps taken and/or components of the risk check might be implemented at client device 202, SSR 208, both client device 202 and SSR 208, some other computing device, or a combination of various computing devices.

By risk checking the quoting order and the hedge order, certain embodiments of the present invention may prevent or eliminate the failure of the trading strategy. In other words, the whole trading strategy is pre-approved by the risk check and the orders for the trading strategy will not have to undergo another risk check during the course of executing the trading strategy, thereby reducing or eliminating risk of failure of the strategy (e.g., getting legged up in the second leg because of a failed risk check). Additionally, unlike in a conventional system, the hedge order can be submitted to the electronic exchange without undergoing a risk check, thereby reducing the time it takes for the hedge order to reach the exchange.

In certain embodiments, when a particular quantity is approved by the risk check, the trader is prevented from using a quantity or taking a position equal to the approved quantity for use in a different trading strategy. That way, when the trading strategy is ready to submit the hedge order, it can do so without fear of rejection, because the hedge order quantity was risk checked and accounted for, regardless of the activity taken by the trader since the trading strategy was initiated. Quantity that is not used by the end of the trading strategy may then be used by other strategies.

IV. Second Example

For example, assume that a trader configures the same two-legged spread as above. However, this time the trader wishes to quote both legs of the spread. With the trading strategy defined, the trader may begin initiating orders.

In certain embodiments, the trader may enter a spread order, which includes a spread price (referred to as a desired spread price) and a spread quantity. Responsively, a tool like Autospreader computes an order quantity to quote each leg of the spread. The order quantity to be hedged in each leg may also be computed using the spread ratio and quoting order quantity. Accordingly, this trading strategy involves two quoting orders and two offsetting hedge orders.

In certain embodiments, the risk check identifies the quantity to be quoted in both legs and the quantity to be hedged in both legs and compares the potential buy and sell quantities in each leg to a corresponding risk value. Similar to the example above, if each of the order quantity is less than the risk value, then trading strategy can proceed and the quoting order is sent to the exchange. When the quoting orders are filled, the hedge orders can be sent without the risk of being rejected by a risk check. However, if any of the order quantities exceeds the check value, then the quoting orders are not sent to the electronic exchange.

In certain embodiments, when a spread order is entered, using Autospreader or some other trading tool, all potential outright orders, including all quoting and all possible hedge orders are risk checked prior to any orders being submitted into the market. If any of the potential orders fails the risk check, then no orders will be placed and the whole trading strategy is rejected.

In certain embodiments, multiple orders may be submitted in place of a single quoting order or a single hedge order. Accordingly, the quantity for all of the orders is totaled. Then, the total quantity is compared with a position risk check parameter, such as discussed above.

V. Third Example

As another example of certain embodiments, assume that a trader configures the same two-legged spread as the first example above. With the trading strategy defined, the trader places the first order (with approval from risk check).

While the first order is pending, the risk check is performed on the trading strategy. In certain embodiments, the method of FIG. 1 is performed. If it determined that the trading strategy is not approved, then the first order is deleted from the exchange. If it is determined that the trading strategy is approved, then the trading strategy can continue.

VI. Conclusion

Embodiments described herein provide for a risk check. The risk check system, method, and computer readable medium bases a decision to allow a trading strategy to proceed on whether the order quantity for each leg of the trading strategy satisfies a certain condition. Particularly, when a trading strategy is initiated, the risk check compares the potential order quantity of each leg to a corresponding risk value. If each of the order quantities is less than the corresponding risk value, then trading strategy can proceed and the order is sent to the exchange. However, if the order quantity for any of the orders exceeds the corresponding risk value, then the initial order is not sent to the electronic exchange. As such, the risk of failure of a trading strategy due to an inability to submit subsequent orders as result of those orders getting rejected by a risk system is minimized, if not reduced entirely, by the embodiments described herein. Additionally, the hedge order can be submitted to the electronic exchange without undergoing a risk check, thereby reducing the time it takes for the hedge order to reach the exchange.

Additionally, quantity associated with the trading strategy may be held for execution of the trading strategy regardless of the activity taken by the trader since the trading strategy was initiated. This held quantity can be drawn from by the trading strategy until the quantity is gone, the trading strategy has ended, or both.

One or more of the steps of the method(s) discussed above may be implemented alone or in combination in various forms in hardware, firmware, and/or as a set of instructions in software, for example. Certain embodiments, including a method, may be provided as a set of instructions residing on a computer-readable medium, such as a memory, hard disk, CD-ROM, DVD, and/or EPROM, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
receiving, by a server side device, a trading strategy definition for a trading strategy that includes a first quantity for a first tradeable object and a second quantity for a second tradeable object, wherein the trading strategy is associated with a position risk value;
determining, by the server side device, a first risk value and a second risk value, wherein the first risk value is associated with the first tradeable object, and the second risk value associated with the second tradeable object;
comparing, by the server side device, a combination of the first and second risk values to the position risk value associated with the trading strategy;
defining, by the server side device when the first and second risk values are less than the position risk value, an execution reserve quantity equal to the combination of the first and second risk values;
submitting, by the server side device, a first order to a first electronic exchange when the combination of the first and second risk values are less than the position risk value, wherein the first order is associated with the first tradeable object;
receiving, by the server side device, a fill confirmation associated with the first order and updating the execution reserve quantity based on a filled quantity in the fill confirmation; and
submitting in response to receiving the fill confirmation, a second order to a second electronic exchange, wherein the second order is associated with the second tradeable object.

2. The method of claim 1, wherein the first tradeable object is different than the second tradeable object.

3. The method of claim 1, wherein the first tradeable object is the same as the second tradeable object.

4. The method of claim 1, wherein the first electronic exchange is different than the second electronic exchange.

5. The method of claim 1, wherein the position risk value associated with the trading strategy is based on at least any one of the following: a trader pre-configured first maximum position for the first tradeable object; a trader pre-configured first maximum order quantity for the first tradeable object; a trader pre-configured second maximum position for the second tradeable object; and a trader pre-configured second maximum order quantity for the second tradeable object.

6. The method of claim 1, further comprising:
reducing, when the combined first and second risk values exceeds the position risk value, at least one of the first quantity to a reduced first quantity prior to submitting the first order, and the second quantity to a reduced second quantity prior to submitting the first order and prior to submitting the second order.

7. The method of claim 1, further comprising:
reducing, when the combined first and second risk values exceeds the position risk value, an order quantity associated with the first quantity for the first tradeable object and the second quantity for the second tradeable object, wherein the reduction is determined according to a percentage reduction.

8. The method of claim 7, wherein the percentage reduction is a user specified value.

9. The method of claim 7, wherein the percentage reduction is identified as part of the trading strategy definition.

10. The method of claim 7, further comprising:
generating a trading strategy notification in response to a reduction in the order quantity associated with the first quantity for the first tradeable object and the second quantity for the second tradeable object.

11. The method of claim 7, wherein reducing the order quantity is an action implemented at a client device.

12. The method of claim 7, wherein reducing the order quantity is an automated action implemented at the server side device.

13. The method of claim 1, wherein the server side device is a gateway in communication with the first electronic exchange and the second electronic exchange as part of a trading network.

14. The method of claim 1, wherein the server side device is in communication with a plurality of client devices implementing a trading application.

15. The method of claim 1, wherein the trading strategy definition is one of a plurality of trading strategy definitions received by the server side device, and where each of the plurality of trading strategy definitions is associated with one of a plurality of position risk values.

* * * * *